United States Patent [19]

Fylling

[11] 4,279,171

[45] Jul. 21, 1981

[54] TORQUE APPLICATOR

[76] Inventor: Tor T. Fylling, Olaf Schous vei 18, Oslo 5, Norway

[21] Appl. No.: 46,840

[22] Filed: Jun. 8, 1979

[30] Foreign Application Priority Data

Jun. 13, 1978 [NO] Norway ............................... 782057

[51] Int. Cl.[3] ....................... B25B 13/46; F16H 27/02

[52] U.S. Cl. ........................................ 74/128; 74/104; 74/107; 81/57.39; 192/0.07

[58] Field of Search ......................... 74/128, 104, 107; 81/57.39; 173/93, 163; 192/0.07, 0.073

[56] References Cited

U.S. PATENT DOCUMENTS

| | | | |
|---|---|---|---|
| 667,350 | 2/1901 | Ulrich et al. | 74/104 X |
| 2,362,499 | 11/1944 | Porter | 74/107 X |
| 2,741,239 | 4/1956 | Nagode | 74/128 X |
| 2,758,569 | 8/1956 | Peterson | 74/128 X |
| 2,831,356 | 4/1958 | Wiman | 74/128 |
| 2,893,256 | 7/1959 | Wargo | 74/107 X |
| 3,759,119 | 9/1973 | Wing | 81/57.39 |
| 3,972,242 | 8/1976 | Hunt | 81/57.39 |
| 4,027,561 | 6/1977 | Junkers | 81/57.39 |
| 4,137,800 | 2/1979 | Austin | 74/128 X |

*Primary Examiner*—Lawrence J. Staab

*Attorney, Agent, or Firm*—Watson, Cole, Grindle & Watson

[57] ABSTRACT

A double-acting piston and a rotatable torque applicator stem are mounted in a torque applicator housing such that the stem is actuated by the double-acting piston. A coupling member is non-movably mounted on the stem and another coupling member is mounted for axial movement thereon, each coupling member including teeth alternately engageable with the teeth of the other coupling member. The movable coupling member includes a radial arm having a free end cooperating with the double-acting piston to cause a reciprocating rotary movement of the axially movable coupling member with respect to the stem. Pressure is alternately applied on one face and the opposite face of the movable coupling member in synchronization with the actuation of the double-acting piston.

4 Claims, 3 Drawing Figures

TORQUE APPLICATOR

BACKGROUND

1. Field of the Invention

The present invention relates to a torque applicator comprising a housing in which is disposed a rotatable torque applicator stem actuated by a hydraulic or pneumatic double-acting piston to apply an intermittent torque on bolts, nuts etc. A torque applicator of this kind is known from Norwegian Patents 115.991 and 136.609. The present invention is a further development of these known torque applicators.

2. Prior Art and Summary of the Invention

The torque applicator of the present invention differs from the prior art in that the two members of a claw coupling are mounted on the rotatable torque applicator stem, one coupling member being fixed and non-movably mounted on the stem, and the other coupling member being mounted for axial movement on the stem. The movable coupling member is provided with a radial arm the free end of which co-operates with the double-acting piston to cause a reciprocating rotary movement of the axially movable coupling member on the applicator stem.

The movable coupling member is adapted to be moved axially on the torque applicator stem by hydraulic or pneumatic pressure on one and the other, respectively, axial end surfaces of the coupling member, in time with the actuation of the piston, the coupling member thereby being brought into and out of engagement with the fixed coupling member.

BRIEF DESCRIPTION OF THE DRAWING

The invention will now be further described with reference to the accompanying drawing showing two embodiments of the invention wherein.

DETAILED DESCRIPTION

Figure 1:
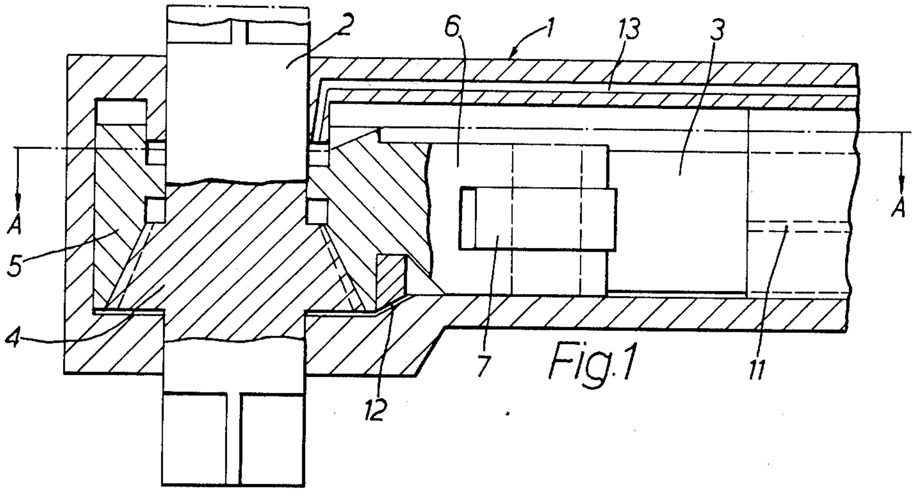
FIG. 1 shows an axial section, with respect to the torque applicator stem, through a torque applicator according to the invention.

The drawing shows a pressure activated torque applicator comprising housing 1 in which are disposed a rotatable torque applicator stem 2 and its torque providing devices. The stem 2 is actuated by a hydraulic or pneumatic double-acting piston 3. A claw coupling is provided between the piston 3 and the stem 2, the coupling comprising a coupling member 4 being fixedly mounted on the stem 2 and a coupling member 5 being axially movable on the stem 2 and being rotatable with respect to the stem 2 when not in engagement with the fixed coupling member 4. The movable coupling member 5 carries a substantially radial arm 6 which at its free end co-operates with the piston 3. FIGS, 2 and 3 show two examples of how the arm 6 may cooperate with the piston 3.

Figure 2:
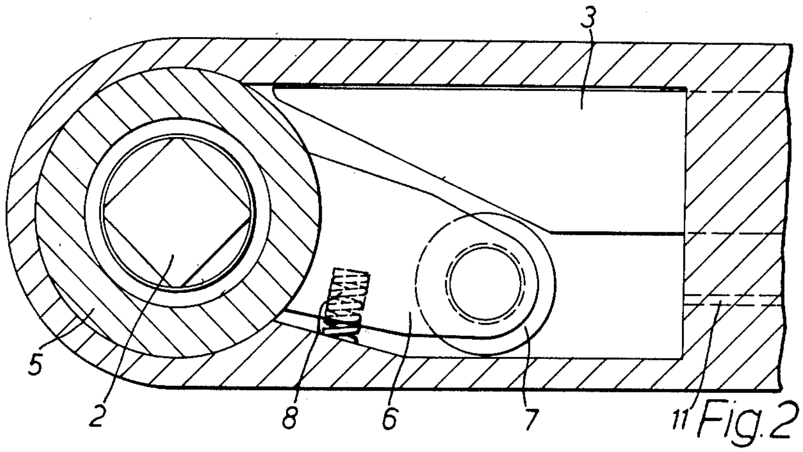
FIG. 2 shows a section through the applicator of FIG. 1, at right angles to the applicator stem, along the line A—A in FIG. 1.

In the embodiment shown in FIG. 2 the piston 3 is provided with an oblique end surface, and the arm 6 carries a roller or the like 7 at its free end for rolling against the oblique surface of the piston 3. To ascertain the return movement of the arm 6 upon the return stroke of the piston 3, a compression spring 8 is provided for action between the arm 6 and a wall of housing 1.

Figure 3:
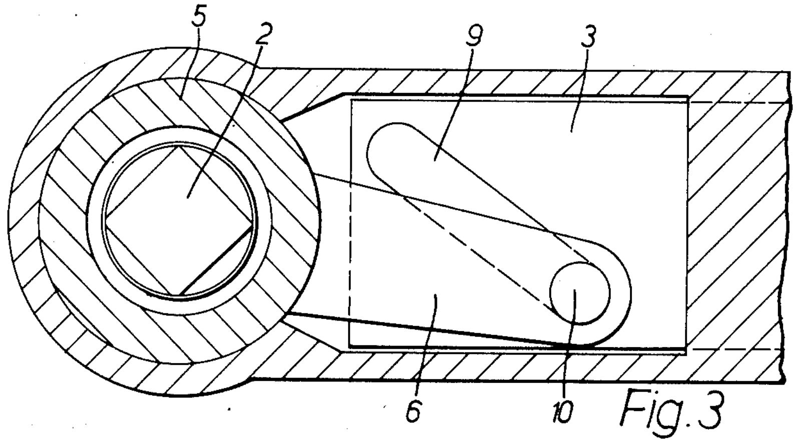
FIG. 3 shows a section corresponding to that of FIG. 2 through an other embodiment of the invention.

In the embodiment shown in FIG. 3 the piston 3 is provided with an oblique slot 9, and the arm 6 carries a pin or the like 10 at its free end which pin extends into the slot 9. In this embodiment there is no need for a returning spring corresponding to the spring 8 in FIG. 2.

In operation, fluid under pressure is passed alternately into the pressure chamber on the one side and on the other side, respectively, of the piston 3, the pressure chamber on only one side of the piston being shown in the drawing, to move the piston reciprocatingly towards and away from the applicator stem 2. Fluid under pressure for bringing the piston 3 away from the stem 2, i.e. towards the right on the drawing, enters the pressure chamber through a passage 11 (FIGS. 1 and 2). Through a passage 12 this fluid is also passed in below the lower face of the movable coupling member 5 to lift the same from the fixed coupling member 4 to allow it to rotate freely with respect to the fixed coupling member and with respect to the applicator stem 2 under the action of the spring 8 (FIG. 2) or through the co-action between the pin 10 and the slot 9 (FIG. 3). When pressurized fluid is brought to act on the opposite (right hand) end face of the piston to move the piston towards the applicator stem 2, pressurized fluid is passed through a passage 13 (FIG. 1) to a restricted space above the coupling member 5 to force the same into engagement with the fixed coupling member 4. Upon co-action between the piston end surface and the roller 7 or between the piston slot 9 and the pin 10, the arm 6 and the movable coupling member 5, and thus also the fixed coupling member 4 and the actuator stem 2, are rotated clockwise as seen in FIGS. 2 and 3.

The co-action faces of the coupling members 4 and 5 may be in the form of claws or in the form of gear rims, and in the embodiment shown in FIG. 1 the gear rims are conical, but even crown gear rims are feasible.

The embodiments of FIGS. 1 to 3 show the applicator having a stem 2 extending from both sides of housing 1, whereby the applicator may be used for tightening and untightening operation without changing the sense of rotation of the stem. In an alternative embodiment, not shown, in which the stem extends to only one side of the housing, the sense of activation of the coupling with respect to the sense of activation of the piston may be changed, whereby the sense of rotation of the stem may be changed at will. When using this alternative embodiment, the coupling (4,5) and thus the entire applicator may be made "slimmer".

What I claim is:

1. A torque applicator, comprising:
   a housing;
   a double-acting piston and rotatable torque applicator stem mounted within said housing and actuated by said double-acting piston;
   two coupling members being mounted on said torque applicator stem, each coupling member including teeth alternately engageable with the teeth on the other coupling member, one of said coupling members being non-movably mounted on said stem and the other of said coupling members being mounted for axial movement on said stem;
   said movable coupling member including a radial arm having a free end cooperating with said double-acting piston to cause a reciprocating rotary movement of the axially movable coupling member with respect to said stem; and means for applying a pressurized fluid alternately on one face and the opposite face of said movable coupling member in synchronization with the actuation of said double-acting piston.

2. A torque applicator according to claim 1 wherein said double-acting piston includes an oblique end surface adapted to co-act with the free end of said radial arm.

3. A torque applicator according to claim 1 wherein said double-acting piston includes an oblique slot adapted to co-act with a pin on the free end of said radial arm.

4. A torque applicator according to claim 1, wherein said double-acting piston includes an oblique end surface adapted to co-act with a roller element on the free end of said radial arm.

* * * * *